Aug. 2, 1960 W. H. MORONG, JR 2,947,942
LIGHT LOAD DEVICE FOR INDUCTION WATTHOUR METER
Filed June 27, 1958 2 Sheets-Sheet 1
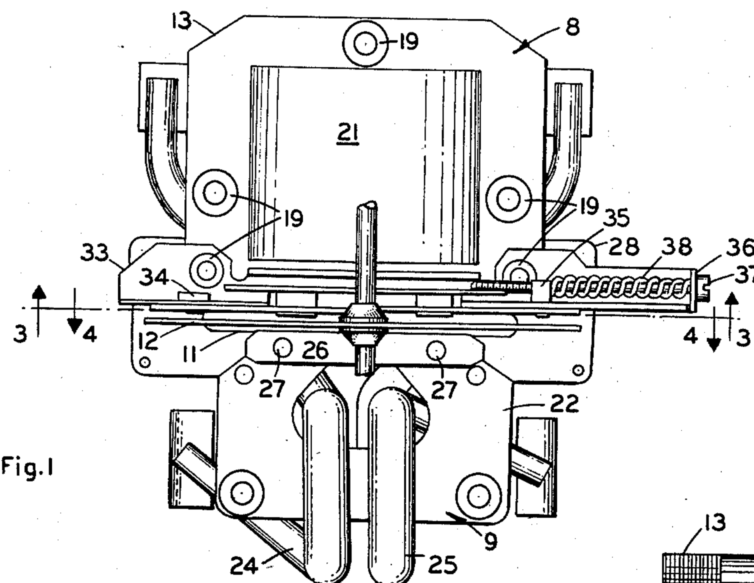
Fig.1
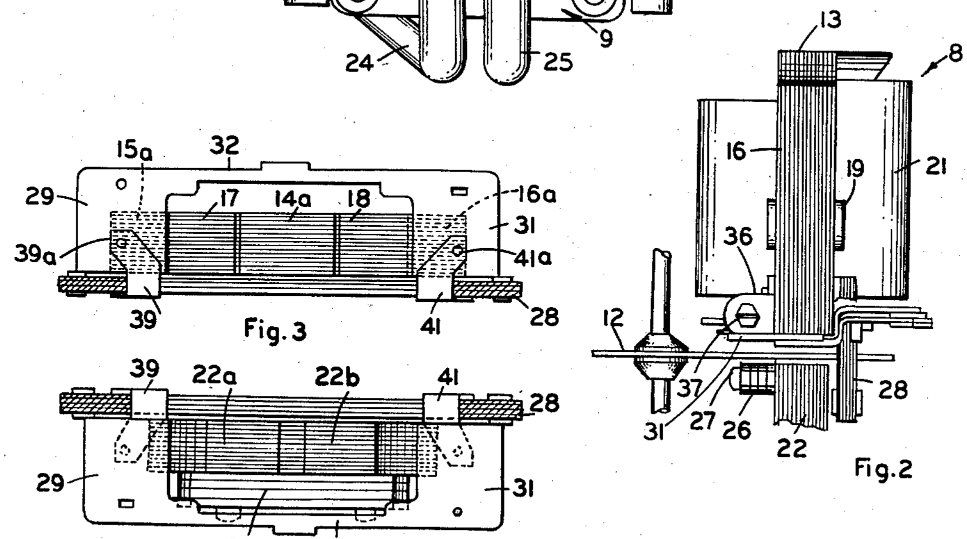
Fig.2
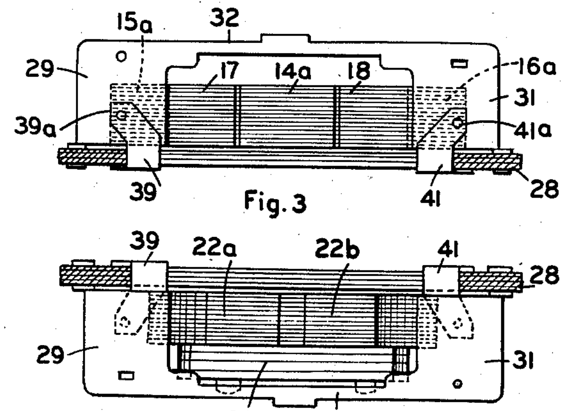
Fig.3
Fig.4
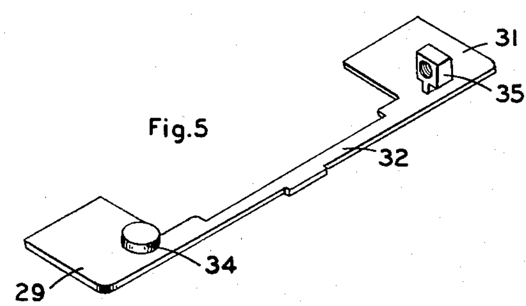
Fig.5
INVENTOR.
William H. Morong, Jr.
BY Robert F. Peck
His Attorney

LIGHT LOAD DEVICE FOR INDUCTION WATTHOUR METER

Filed June 27, 1958 2 Sheets-Sheet 2

INVENTOR.
William H. Morong, Jr.
BY Robert J. Peck
His Attorney

United States Patent Office 2,947,942

Patented Aug. 2, 1960

2,947,942

LIGHT LOAD DEVICE FOR INDUCTION WATTHOUR METER

William H. Morong, Jr., South Berwick, Maine, assignor to General Electric Company, a corporation of New York Filed June 27, 1958, Ser. No. 745,213

6 Claims. (Cl. 324—137)

This invention relates to a new and improved light load torque correcting device for an induction watthour meter.

Heretofore, it has been a conventional practice to obtain light load torque correction in induction watthour meters by utilizing a closed loop of electrically conductive material, mounted so as to enclose the main voltage flux producing pole, directly above the meter disc, and movable from side to side. Circulating currents proportional to voltage flux are induced within the loop, and movement of the loop to either side of its central neutral position produces a mechanical displacement of the induced current, which, coupled with the lagging effect of these induced currents, produces a torque which may be adjusted to compensate for the normal light load errors inherent in low cost, mass-produced watthour meters. As is well known, such errors are usually caused by such factors as friction and low permeability of the magnetic circuits at low flux densities.

Unfortunately, the above type of light load torque correction introduces certain undesirable secondary effects which may require additional compensating adjustments and thus add to the complexity of obtaining proper meter calibration, or which may be such that optimum calibration cannot be fully realized. For example, the closed loop causes lagging or electrical displacement of the main voltage flux as a function of the resistance of the loop, and since this resistance normally changes with temperature, the so-called class II temperature error is increased and is, therefore, more difficult to compensate. The loop resistance also varies with the physical dimensions and alloy composition of the loop, necessitating an added range of adjustment in the lag compensating arrangements normally used in the associated meters. Also, just as a compensating torque is produced by the loop's action on voltage flux, a similar secondary effect is produced by its action on current flux, which must be minimized.

Some attempts have been made to overcome the undesirable secondary effects associated with the closed loop type of light load correcting devices by resorting to various form of magnetic correcting devices. However, such prior forms of magnetic correcting devices have been generally unacceptable, either because of their limited range of adjustment or because of the difficulties in obtaining satisfactory performance from unit to unit during mass production of the meters. The manner in which such prior magnetic correcting devices were used to obtain light load compensation generally involved a placement on the meters which inherently subjected the devices to vibration which in many instances would cause objectionable noise during operation of the meter.

Accordingly, it is a primary object of this invention to provide a new and improved light load correcting device for an induction watthour meter which overcomes the difficulties normally associated with prior forms of such devices.

It is another object of this invention to provide a novel magnetic light load correcting device which features improved compensating action, ease of adjustment, and economy of manufacture.

Briefly, the invention comprises a pair of spaced magnetic elements which are adjsutably mounted in the flux path between the current core and the auxiliary flux producing poles formed by the outer legs of a conventional E-shaped voltage electromagnet. The magnetic elements are mounted so as to move together across the face of the auxiliary voltage flux poles such that unequal reluctances can be established to produce unequal flux paths through the meter disc on opposite sides thereof. Such unequal flux paths will result in an unequal concentration of voltage flux on opposite sides of the disc, which will produce unequal but opposite torques on the disc, with the net effect being an unbalanced torque which will cause the disc to speed up or slow down, depending upon which side of the disc the net torque appears.

The invention, together with its objects and advantages, will be more fully understood upon reference to the detailed description set forth below, particularly when taken in conjunction with the drawings annexed hereto, in which:

Figure 1 is a front view, in elevation, of an induction watthour meter which embodies the light load torque correcting device forming the present invention;

Figure 2 is a partial side view, in elevation, of the arrangement shown in Figure 1;

Figure 3 is a partial view taken along the lines 3—3 in Figure 1;

Figure 4 is a view similar to Figure 3, taken along the lines 4—4 in Figure 1 with the disc removed;

Figure 5 is a perspective view of the magnetic light load torque correcting device;

Figure 6:
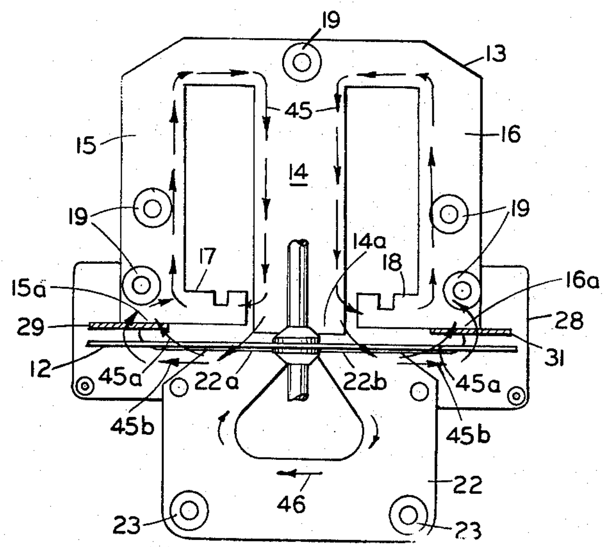
Figure 6 is a view of the magnetic core structure of the watthour meter shown in Figure 1, with arrows showing instantaneous directions of voltage flux.

Referring first to Figure 1, the invention is shown as applied to an induction watthour meter of the type which is shown in the co-pending application of Scamman et al., Serial No. 631,854, filed December 31, 1956, entitled, "Induction Watthour Meter," now Patent No. 2,930,980, issued March 29, 1960, and assigned to the assignee of the instant application. For a complete description of the watthour meter shown in Figure 1, reference will be had to the aforesaid co-pending application; and for purposes of illustrating and describing the present invention, the watthour meter shown in Figure 1 will be described but briefly. Thus, it is seen that the watthour meter comprises a voltage electromagnet 8 and a current electromagnet 9 arranged symmetrically with respect to one another and relative to the common vertical axis of the meter, and separated by an air gap 11, in which is mounted a rotary disc armature 12. As is well known in such meters, the rotary disc is made of a suitable electrically conducting material, and the interaction of the fluxes produced by the voltage and current electromagnets with the disc causes it to rotate. A suitable register mechanism coupled to the disc will thus indicate energy consumed in the known manner.

In the interests of brevity, the details of the mounting arrangements for the disc shaft as well as other components associated with the electromagnets which together form a complete self-contained watthour meter have been omitted, since such details are well known in the art, being shown in such patents as Hansen, No. 2,311,382, and Goss et al., No. 2,668,275, both of which are assigned to the assignee of the present application.

The voltage electromagnet 8 comprises a substantially E-shaped core member 13, having a center leg 14 and a pair of spaced outer legs 15 and 16. The outer extremities of each of the legs of the E-shaped core form voltage flux producing poles, which, for convenience, have been designated as the main voltage flux producing pole 14a and the auxiliary flux producing poles 15a and 16a. The pole faces of all of the voltage flux producing poles face toward the disc. As is conventional with such E-shaped cores, the outer legs 15, 16 have identical shunting portions 17, 18, respectively, which project inwardly toward the center leg 14, both of which are spaced from the center leg by suitable air gaps. Normally, the E-shaped core comprises an assembly of identical E-shaped laminations of magnetic material held together securely by suitable means, such as the rivets 19 or the like. Surrounding the center leg of the voltage core is a voltage winding 21, which may be in the form of a plurality of turns of fine wire wound on the leg 14 and covered by an insulating material that is molded thereon.

The current electromagnet includes the substantially U-shaped core member 22, which like the core member 13 may be a plurality of identical substantially U-shaped laminations that are held together securely by suitable means, such as the rivets 23 or the like. The current core provides two current flux producing poles 22a and 22b, both of which underly the disc 12 with their pole faces facing the disc and the pole faces of the voltage flux producing poles. As is described in the aforesaid co-pending Scamman et al. application, the current winding has the novel form of the suitably insulated, partially open turns 24, 25 respectively, and the current electromagnet also includes the conventional current flux shunting member 26, which spans the air gap separating the current flux producing poles on one side of the core structure 22 to which it may be securely held by suitable means, such as the rivets 27 or the like. To complete the electromagnet structure, a novel auxiliary voltage flux return member 28 is affixed to the voltage electromagnet as shown, the details of such mounting and the purpose served thereby being fully described in the aforesaid co-pending Scamman et al. application.

So far, and except for certain features which have been discussed but briefly—in that they form the substance of the invention described and claimed in the aforesaid co-pending application of Scamman et al.—it is seen that the basic electromagnet structure, which defines main and auxiliary voltage flux producing poles on one side of the armature facing a pair of spaced current flux producing poles on the other side of the armature, is a conventional and well known electromagnet arrangement used heretofore in induction watthour meters.

As is well known with induction watthour meters, it is common practice to use light load torque correcting devices, and the present invention is directed to a novel and improved form of such device, which comprises, as is best seen in Figures 3, 4, 5, 6, and 7, a pair of spaced substantially identical flat magnetic members 29, 31, joined together by the bridge section 32 to form an integral compensating device. The device is mounted in the air gap 11 with the magnetic members 29, 31 underlying the auxiliary voltage flux producing poles 15a, 16a, respectively, and overlying portions of the rotary disc 12. In order to mount the light load torque correcting device in the meter, an L-shaped bracket 33 has its side leg riveted to the voltage electromagnet by means of the rivets 19 and has its base provided with a pair of elongated slots (not shown) for receiving therein the shank of a rivet 34 and the shank of a nut 35, which are affixed to the magnetic members 29, 31, respectively. The elongated slots allow the shanks of the rivet 34 and the nut 35 to move toward or away from the common vertical axis of the watthour meter, so that the magnetic members 29, 31 can move together to either side in a direction at right angles to the aforesaid meter axis. One end of the L-shaped bracket 33 is turned in to form an apertured ear 36 for the purpose of mounting an adjusting screw 37 therein. The threaded shank of screw 37 engages nut 35, there being a spring 38 surrounding the shank between the nut and the ear 36. The spring is under compression at all times to hold the nut in a fixed position relative to ear 36, and, as seen, the position of the nut can be shifted by merely turning the screw 37 in one direction or the other. As the nut shifts, the magnetic members 29, 31 move together in one direction or another as desired for proper light load torque correction. The aforesaid arrangement is conventional, being similar to the mounting arrangements for the light load plate shown in United States Patent No. 2,830,270, Landry, also assigned to the assignee of the present invention.

To further hold the magnetic members properly in place in the watthour meter, a pair of spring clips 39, 41 are provided, which are affixed to the voltage flux return member 28 and which are dimpled at 39a and 41a in the portions thereof which bear against the magnetic members 29, 31. These spring clips urge the magnetic members against the face of the auxiliary flux producing poles 15a and 16a so that the magnetic members are simply but securely held in place in the meter.

Figure 7:
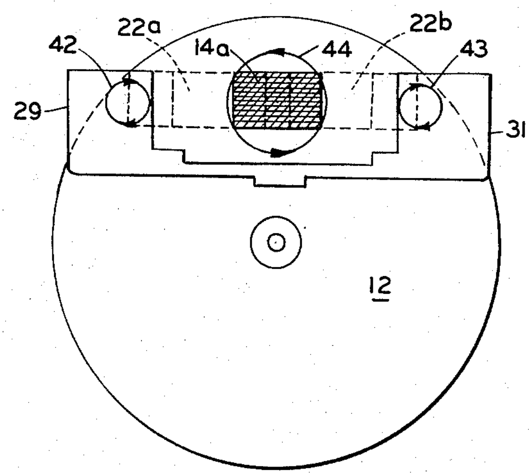
Figure 7 is a view similar to Figure 4 but including the disc and a part of the main voltage flux pole, with arrows showing the direction of the instantaneous currents induced in the disc by the flux pattern shown in Figure 6.

Looking now at Figures 6 and 7, and assuming that the instantaneous polarities of the current in the voltage and current electromagnets are such as to produce magnetic fluxes in their respective cores indicated by the arrows 45 and 46, respectively, it is noted that a portion of the voltage flux is at all times shunted through the shunting members 17, 18 between the center leg 14 and the outer legs 15 and 16. Portions 45a of the voltage flux 45 also cross the gap 11 where they pass through the disc in the well known manner, skirt along the outer edges of the current poles 22a, 22b, from whence they return across the gap through the disc to the auxiliary voltage poles 15a and 16a. As is described in the aforesaid Scamman et al. application, a portion 45b of the voltage flux passes through the disc and into the voltage flux return member 28, through which it travels until it returns to the legs 15, 16. This latter path of the voltage flux passing through the disc is of no concern in connection with the function of the light load torque correcting device and can be dismissed from further consideration. The path of voltage flux travel of interest is 45a—that which passes between the current core member and the auxiliary voltage flux poles 15a and 16a. As is seen in Figure 7, these fluxes induce currents in the disc, the directions of same being generally indicated by the circular arrow patterns 42, 43, shown in Figure 7. The voltage flux emanating from the main voltage pole 14a also induces a current in the disc 12, with its direction being generally indicated by the circular arrow pattern 44.

Assuming that the magnetic members 29, 31 are in their neutral position, which places them symmetrically with respect to the common vertical axis of the meter, the interaction between the disc 12 and the voltage fluxes passing between the current core member 22 and the auxiliary flux producing poles 15a and 16a produces a torque in each instance, which on one side of the disc tends to speed the disc up and on the other side tends to slow it down. In the neutral position, these torques are substantially equal and have opposite effect on the disc and thus cancel themselves, producing no net torque which affects the speed of rotation of the disc. However, if the magnetic members are moved to one side or the other in relation to the common axis of the meter, the magnetic members 29, 31 will shift together to unequally change the magnetic reluctance in the paths traversed by the flux passing between the current core member and the auxiliary poles 15a and 16a. For example, and using Figure 6 for reference purposes, and assuming that the light load torque correcting device is moved to the right, the magnetic reluctance of the path for the flux between current core 22 and pole 16a will be increased. This results from the displacement of the magnetic member 31 to the right, which has the effect of removing magnetic material from the gap separating core 22 and pole **16*a* to thereby increase its reluctance. At the same time, more of the magnetic member 29 is moved into the gap separating core 22 and pole 15*a* to thereby decrease its magnetic reluctance, the net effect of such movement being to enhance the flow of flux between pole 15*a* and core 22 and suppress the flow of flux between pole 16*a* and core 22. This action will result in a greater concentration of flux passing through the disc on the left-hand side of the meter than on the right-hand side, which has the further effect of increasing the torque on the left-hand side by reason of the added flux through the disc. The torques, then, will be unequal, and the disc will be speeded up in an amount proportional to the net compensating torque produced. The magnitude of the increase in speed may be precisely adjusted by appropriate adjustment of the screw 37. If it is desired to decrease the meter speed to obtain proper light load correction, the screw 37** is manipulated to move the magnetic members to the left so that the decrease in reluctance occurs in the right-hand portion of the meter, with the increase occurring in the left-hand portion.

Adding to this change in reluctance brought about by the lateral displacement of the spaced magnetic members is the tendency for the eddy currents in the disc to become unequally displaced in phase from one another. This is accounted for by the fact that as the magnetic members 29, 31 are moved in the direction toward the edge of the disc, the eddy current has a tendency to be squeezed into a smaller area of the disc, such that its circuit will become more highly resistive and less inductive. If this happens on one side of the disc, the circuit for the eddy current on the other side of the disc becomes less resistive and more inductive, the net effect being the approach of a rotating flux which is in proper direction for compensating purposes.

As is discussed in the aforesaid co-pending application of Scamman et al., the watthour meter which has been shown herein to illustrate the present invention is a so-called Class 200 meter, which means that it is capable of accurately metering loads up to 200 amperes per line in a conventional single-phase distribution system of the three-wire type. With the light load torque correcting device shown and described herein, it has been found that such meters can be given a nominal rating of either 15 or 30 amperes and attain a light load performance at either rating which is precisely "on-line" at either 1.5 or 3 amperes. That is, the ratio of meter readings to true watthours is unity at the conventional light load point for either a 15 or 30 ampere rating, which thus demonstrates the superior light load torque correction realized with the present invention.

Although the magnetic members 29, 31 have been shown as an integral unit with the bridging section 32, it is not necessary for the bridging section to be a magnetic piece, for the device would work equally as well with a nonmagnetic bridge connecting the two magnetic members. For convenience and ease in manufacturing the integral construction has been used. However, it is to be noted that the bridging section 32 is well in front of the meter, where it has no effect on the fluxes traversing the various parts of the voltage and current electromagnets.

Also, superior compensation may be obtained using various grades of silicon steel or mumetal. A range in adjustment exceeding 20 percent is achieved with the invention, with the secondary effect on current flux at maximum load being very close to zero.

It is to be understood that conventional lag compensating members may be used in conjunction with the light load torque correcting device, and since the magnetic members 29, 31 have no significant lagging effect on the voltage flux, there is no secondary effect introduced by the magnetic members, which adds to the class II temperature error or requires any compensating adjustment of the lag compensator.

In addition, and aside from the light load torque correction obtained, it has been found that the use of the magnetic members produces an over-all torque elevation in the meter by virtue of the fact that the air gaps separating the current core and the auxiliary voltage flux producing poles have been narrowed to some extent.

Finally, it is to be understood that the magnetic members do not have to be in contact with the pole faces of the auxiliary voltage flux producing poles but have been shown in contact therewith in the manner described above solely for the purpose of simplifying the mounting arrangements for the light load torque correcting device. Also, the size of the magnetic members is easily determined for optimum effect, in that if they are too large, displacement will have to exceed permissible limits before any significant compensating action is achieved; whereas, if they are too small, there will be an insufficient effect on the reluctance to achieve any degree of compensating action.

Therefore, while a particular embodiment of the subject invention has been shown and described herein, it is in the nature of description rather than limitation, and it will occur to those skilled in the art that various changes, modifications, and combinations may be made within the province of the appended claims, and without departing either in spirit or scope from this invention in its broader aspects.

What I claim as new and desire to secure by Letters Patent of the United States is:

1. In an induction watthour meter, in combination: a rotary disc of conducting material; a voltage electromagnet arranged on one side of said disc, said voltage electromagnet including a substantially E-shaped core member which has its center leg in the form of a main voltage flux pole and its outer legs in the form of auxiliary voltage flux poles, all of said voltage flux poles facing said disc; a current electromagnet arranged on the other side of said disc having a core member providing a pair of spaced current flux poles which face said disc and said voltage flux poles; said voltage and current electromagnets being arranged symmetrically relative to a common axis which extends at right angles to said disc; a light load torque correcting device comprising a pair of spaced magnetic members mounted relative to said voltage electromagnet such that said magnetic members are on opposite sides of said common axis and underly said auxiliary voltage flux poles with each located in the primary flux path between a corresponding auxiliary voltage flux pole and said current flux core member, said magnetic members when in a neutral position being symmetrically arranged relative to said common axis and providing paths of substantially equal magnetic reluctance for the voltage fluxes passing between said current flux core and said auxiliary voltage flux poles, said voltage fluxes being substantially equal when the magnetic members are in their neutral position to produce by interaction with the disc equal and opposite torques on the disc; and means for moving said magnetic members together across the face of said auxiliary voltage flux poles in either direction relative to said common axis to establish an unsymmetrical arrangement of said magnetic members whereby said paths of magnetic reluctance become unequal, said voltage fluxes being unequal whenever the magnetic members are unsymmetrically arranged to produce by interaction with the disc unequal and opposite torques on the disc from which is derived a net compensating torque which either aids or retards disc rotation depending upon which side of the common axis the net compensating torque occurs.

2. In an induction watthour meter, in combination: a rotary disc of conducting material; a voltage electromagnet arranged on one side of said disc, said voltage electromagnet including a substantially E-shaped core member which has its center leg in the form of a main voltage flux pole and its outer legs in the form of auxiliary voltage flux poles, all of said voltage flux poles facing said disc; a current electromagnet arranged on the other side of said disc having a core member providing a pair of spaced current flux poles which face said disc and said voltage flux poles; said voltage and current electromagnets being arranged symmetrically relative to a common axis which extends at right angles to said disc; a light load torque correcting device mounted between said auxiliary voltage flux poles and said disc, said device including a pair of spaced magnetic members, said magnetic members when in a neutral position being symmetrically arranged on opposite sides of said common axis with each underlying corresponding ones of said auxiliary voltage flux poles to provide paths of substantially equal magnetic reluctance for voltage flux passing between said auxiliary voltage flux poles and said current flux core member, said voltage fluxes being substantially equal when the magnetic members are in their neutral position to produce by interaction with the disc equal and opposite torques on the disc, and means to move said magnetic members together across the face of said auxiliary voltage flux poles in either direction relative to said common axis to establish an unsymmetrical arrangement of said magnetic members whereby said paths of magnetic reluctance become unequal, said voltage fluxes being unequal whenever the magnetic members are unsymmetrically arranged to produce by interaction with the disc unequal and opposite torques on the disc from which is derived a net compensating torque which either aids or retards disc rotation depending upon which side of the common axis the net compensating torque occurs.

3. In an induction watthour meter, in combination: a rotary disc of conducting material; a voltage electromagnet arranged on one side of said disc, said voltage electromagnet including a substantially E-shaped core member which has its center leg in the form of a main voltage flux pole and its outer legs in the form of auxiliary voltage flux poles, all of said voltage flux poles facing said disc; a current electromagnet arranged on the other side of said disc having a core member providing a pair of spaced current flux poles which face said disc and said voltage flux poles; said voltage and current electromagnets being arranged symmetrically relative to a common axis which extends at right angles to said disc; a light load torque correcting device mounted between said auxiliary voltage flux poles and said disc, said device including a pair of spaced magnetic members, said magnetic members when in a neutral position being symmetrically arranged on opposite sides of said common axis with each underlying one of said auxiliary voltage flux poles and said magnetic members being proportioned such that in said neutral position they overly portions of substantially equal area of said disc, and means to move said magnetic members together across the face of said auxiliary voltage flux poles in either direction relative to said common axis to establish an unsymmetrical arrangement of said magnetic members whereby they overly portions of unequal area of said disc.

4. The combination defined by claim 3 wherein said magnetic members when in said neutral position cover the major portion of the pole face areas of said auxiliary voltage flux poles.

5. The combination defined by claim 4 wherein said magnetic members are joined together by bridging means to form an integral unit and spring means are provided to urge said unit against the pole faces of said auxiliary voltage flux poles.

6. In an induction watthour meter, in combination: a rotary disc of conducting material; a voltage electromagnet arranged on one side of said disc, said voltage electromagnet including a substantially E-shaped core member which has its center leg in the form of a main voltage flux pole and its outer legs in the form of auxiliary voltage flux poles, all of said voltage flux poles facing said disc; a current electromagnet arranged on the other side of said disc having a core member providing a pair of spaced current flux poles which face said disc and said voltage flux poles; said voltage and current electromagnets being arranged symmetrically relative to a common axis which extends at right angles to said disc; a light load torque correcting device mounted between said auxiliary voltage flux poles and said disc, said device including a pair of spaced flat magnetic members, said magnetic members when in a neutral position being symmetrically arranged on opposite sides of said common axis with each underlying and covering equal areas of the pole face of corresponding ones of said auxiliary voltage flux poles, and means to move said magnetic members together across the face of said auxiliary voltage flux poles in either direction relative to said common axis to establish an unsymmetrical arrangement of said magnetic members whereby they cover unequal areas of said pole faces.

References Cited in the file of this patent

UNITED STATES PATENTS

| | | |
|---|---|---|
| 1,786,821 | Callsen | Dec. 30, 1930 |
| 1,826,447 | Beusch | Oct. 6, 1931 |
| 1,835,750 | Beusch | Dec. 8, 1931 |

FOREIGN PATENTS

| | | |
|---|---|---|
| 354,759 | Great Britain | Aug. 10, 1931 |